(12) United States Patent
Uetani

(10) Patent No.: US 6,928,115 B2
(45) Date of Patent: Aug. 9, 2005

(54) COMPRESSION-ENCODED DATA DECODING APPARATUS CROSS-REFERENCE TO RELATED APPLICATIONS

(75) Inventor: Yoshiharu Uetani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 481 days.

(21) Appl. No.: 09/942,607

(22) Filed: Aug. 31, 2001

(65) Prior Publication Data

US 2002/0041630 A1 Apr. 11, 2002

(30) Foreign Application Priority Data

Sep. 29, 2000 (JP) ........................................ 2000-300433

(51) Int. Cl.$^7$ ................................................. H04N 7/12
(52) U.S. Cl. .............................. 375/240.12; 375/240.24
(58) Field of Search ....................... 341/67; 348/14.01; 369/13.02; 375/240.03, 240.12–240.16, 240.18, 240.2, 240.23, 240.24; 382/232, 233; 714/781; H04N 7/12, 7/32

(56) References Cited

U.S. PATENT DOCUMENTS

| | | | | | |
|---|---|---|---|---|---|
| 5,418,762 | A | * | 5/1995 | Kitayama | 369/13.02 |
| 5,440,345 | A | * | 8/1995 | Shimoda | 375/240.14 |
| 5,602,549 | A | * | 2/1997 | Jeong | 341/67 |
| 5,666,161 | A | * | 9/1997 | Kohiyama et al. | 375/240.18 |
| 5,801,841 | A | * | 9/1998 | Suzuki | 382/232 |
| 5,838,825 | A | * | 11/1998 | Obayashi et al. | 382/233 |
| 5,854,799 | A | * | 12/1998 | Okada et al. | 714/781 |
| 5,889,560 | A | * | 3/1999 | Lee | 375/240.12 |
| 6,055,272 | A | * | 4/2000 | Kim | 375/240.24 |
| 6,100,826 | A | * | 8/2000 | Jeon et al. | 341/67 |
| 6,313,863 | B1 | * | 11/2001 | Chida | 348/14.01 |
| 6,571,019 | B1 | * | 5/2003 | Kim et al. | 375/240.23 |
| 2002/0122483 | A1 | * | 9/2002 | Tanaka et al. | 375/240.03 |

FOREIGN PATENT DOCUMENTS

| JP | 9-135446 | 5/1997 |
|---|---|---|
| JP | 9-261641 | 10/1997 |

* cited by examiner

*Primary Examiner*—Richard Lee
(74) *Attorney, Agent, or Firm*—Oblon, Spivak, McClelland, Maier & Neustadt, P.C.

(57) ABSTRACT

A decoding apparatus comprises a variable length decoder that decodes zero-run length and nonzero coefficient, an inverse quantizer that inverse-quantizes the nonzero coefficient, a zero-run reconstruction processor that reconstruct zero coefficients, a FIFO memory that store the zero-run length data and nonzero coefficients, an inverse discrete cosine transformer that subjects the coefficients to an inverse discrete cosine transformation, and a motion compensator that subjects the transformed result to a motion compensation.

8 Claims, 5 Drawing Sheets

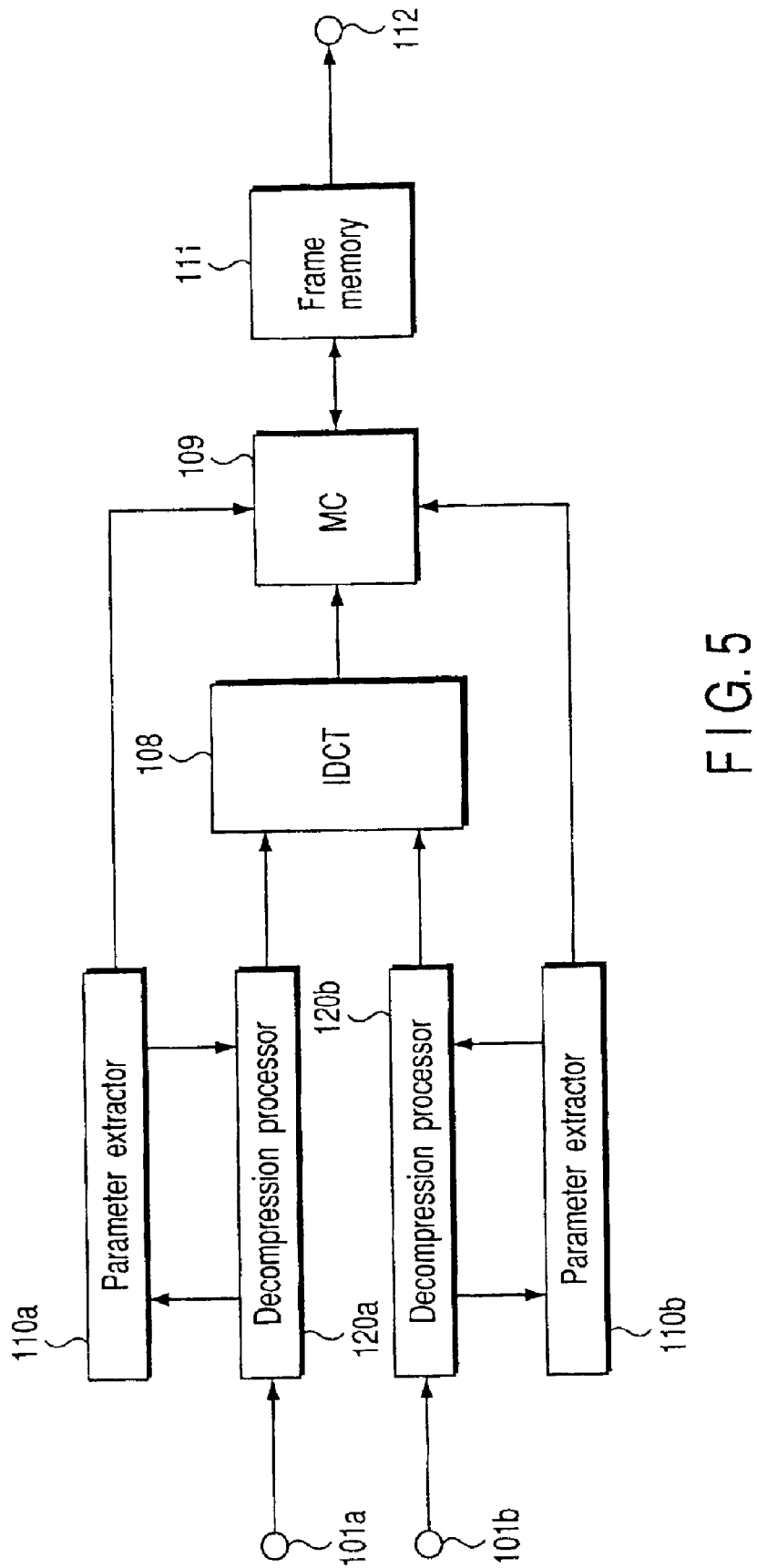
F I G. 5

COMPRESSION-ENCODED DATA DECODING APPARATUS CROSS-REFERENCE TO RELATED APPLICATIONS

CROSS-REFERENCE TO RELATED APPLICATIONS

This application is based upon and claims the benefit of priority from the prior Japanese Patent Application No. 2000-300433, filed Sep. 29, 2000, the entire contents of which are incorporated herein by reference.

BACKGROUND OF THE INVENTION

1. Field of the Invention

The present invention relates to a data decoding apparatus for decoding compression-encoded video data with a low delay and at a high speed, the compression-encoded video data being obtained by compression-encoding a video image in accordance a video encoding scheme as represented by an MPEG scheme employing Discrete Cosine Transformation (DCT).

2. Description of the Related Art

Conventionally, it has been well known that an MPEG video decoder is employed as a data decoding apparatus for decoding, with a comparatively low delay, video data compression-encoded based on an MPEG (Moving Picture Experts Group) scheme in conformance with International Standards for Moving Picture Encoding.

In the conventional data decoding apparatus, input compression-encoded video data is decoded through a syntax interpreter, a variable length decoder, a dequantizer, a zero-run reconstruction device, a block buffer, an inverse discrete cosine transformer, a micro-block buffer, and a motion compensator. The block buffer is employed to temporarily stores the reconstruction result of the zero-run reconstruction device, and output it in order of coefficients suitable to processing by means of the rear stage inverse discrete cosine transformer for each block. The macro-block buffer is employed to carry out processing of the motion compensator in units of a plurality of blocks. The decoding result of the variable length decoder inputs to a parameter decoder as well, and a parameter required for the block buffer is extracted.

However, in this decoding processor, processing at the zero-run reconstruction device is carried out in units of blocks. In a block with the small number of nonzero coefficients, decoding process for each block terminates within a short period of time. Thus, there is a problem that processing of the variable length decoder arranged at the front stage of the zero-run reconstruction device stops frequently every block, a standby time is increased until next processing has been enabled at the syntax interpreter or parameter decoder, and a processing speed is lowered.

Therefore, in particular, in the case where an attempt is made to decode compression-encoded data with a high encoding rate such as a high definition digital TV broadcast signal, it is required to terminate processing in units of blocks within a short period of time. Thus, it is required to speed up processing of a majority of processors of the data decoding apparatus in order to compensate for the lowered processing efficiency of this variable length decoder. As a result, the circuit scale of the entire apparatus is increased, and power consumption is increased.

As has been described above, in the conventional data decoding apparatus, the entire processing speed is slower due to the lowered processing efficiency of the variable length decoder. Therefore, in the case where an attempt is made to decode compression-encoded data with a high encoding rate, it is required to speed up the processing of a majority of processors of the apparatus. Thus, there has been a problem that the circuit scale and power consumption are increased.

BRIEF SUMMARY OF THE INVENTION

It is an object of the present invention to provide a data decoding apparatus for efficiently improving performance of variable length decoding.

According to a first aspect of the invention, there is provided a decoding apparatus configured to decode compression-encoded video data including a variable length code in units of one block, comprising: a variable length decoder which decodes the variable length code to output a zero-run length and a nonzero coefficient; an inverse quantizer which inverse-quantizes the nonzero coefficient to output an inverse-quantized result and transforms the zero-run length into scan-address; a zero-run reconstruction processor which reconstruct zero coefficients corresponding to the zero-run length (scan-address data); a FIFO (First-In First-Out) memory arranged between the inverse quantizer and the zero-run reconstruction processor and configured to store the zero-run length data (scan-address data) and nonzero coefficients, the memory operating with first-in first-out and having a memory capacity for storing coefficients contained in a plurality of blocks; an inverse discrete cosine transformer which subjects the reconstructed coefficients and the inverse quantized coefficient to an inverse discrete cosine transformation to output a transformed result; and a motion compensator which subjects the transformed result to a motion compensation.

According to a second aspect of the invention, there is provided a decoding apparatus configured to decode compression-encoded video data including a variable length code in units of one block, comprising:

a plurality of decoding processors configured to decompress compression-encoded video data corresponding to a plurality of channels, respectively, each of the decoding processors including:

a variable length decoder which decodes the variable length code to output a zero-run length and a nonzero coefficient;

an inverse quantizer which inverse-quantizes the nonzero coefficient to output an inverse-quantized result;

a zero-run reconstruction processor which reconstruct zero coefficients corresponding to the zero-run length; and a FIFO (First-In First-Out) memory arranged between the inverse quantizer and the zero-run reconstruction processor and configured to store the zero-run length data and nonzero coefficients, the memory operating with first-in first-out and having a memory capacity for storing coefficients contained in a plurality of blocks;

a plurality of parameter extractors provided corresponding to the decoding processors, and configured to generate parameters concerning one macro-block every time the variable length decoder incorporated in each of the decoding processors completes decoding of one block; and an inverse discrete cosine transformer which subjects the coefficients from the decoding processors to inverse discrete cosine transformation to obtain transformed coefficients; and a motion compensator which subjects the transformed coefficients to a motion compensation in accordance with the parameters concerning one block input from the parameter extractors alternately.

BRIEF DESCRIPTION OF THE SEVERAL VIEWS OF THE DRAWING

FIG. 5 is a block diagram illustrating a data decoding apparatus according to a third embodiment of the present invention.

DETAILED DESCRIPTION OF THE INVENTION

Figure 1:
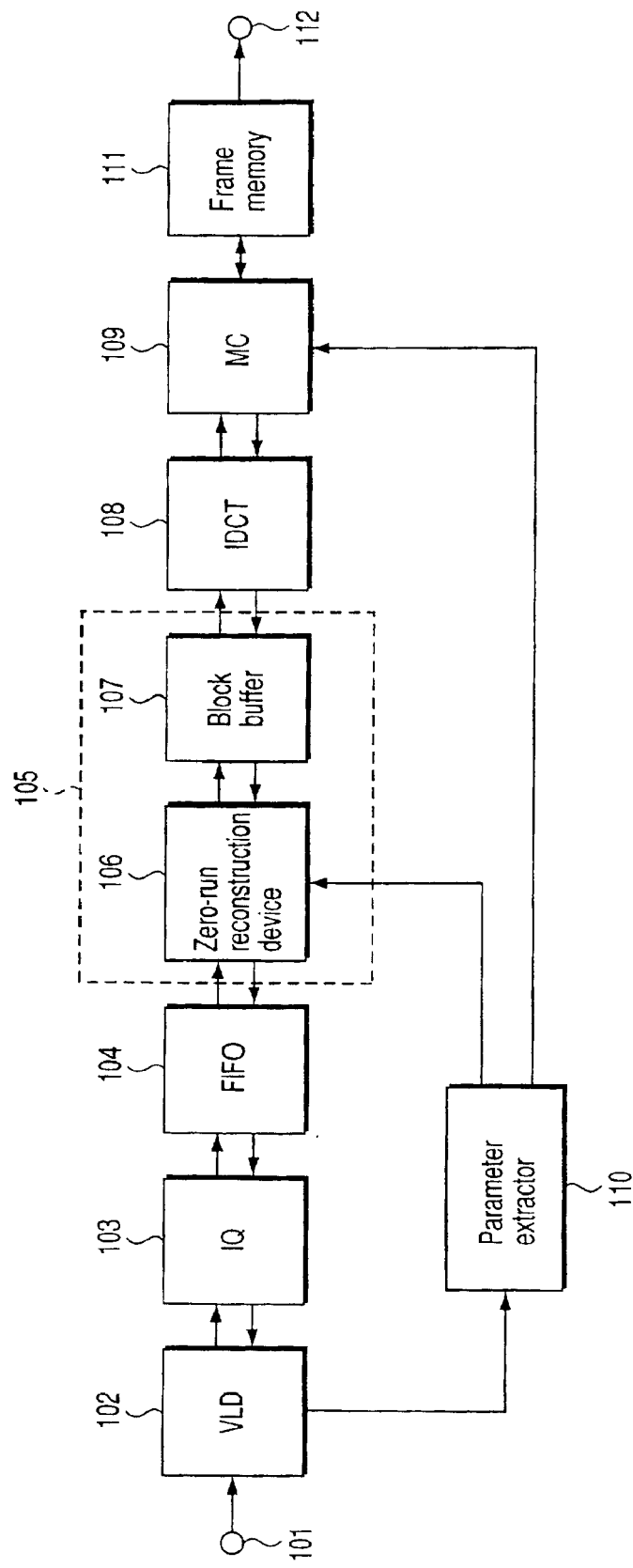
FIG. 1 is a block diagram illustrating a data decoding apparatus according to a first embodiment of the present invention.

FIG. 1 shows a data decoding apparatus according to a first embodiment of the present invention. Compression-encoded video data (encoded bit stream) obtained by compressing video data in accordance with an MPEG scheme, for example, by means of a video data encoding apparatus (not shown) inputs to an input terminal 101 via a transmission system or a storage medium. The compression-encoded video data is generated as follows by showing an example when the encoding scheme is the MPEG2 scheme.

First, a video signal to be encoded is divided into macro-blocks configured by a plurality of pixels (for example, 16 pixels×16 lines for luminance signal). Then, a video signal or a prediction error signal indicating an error between the video signal and a predictive signal is subjected to discrete cosine transformation (DCT) every block (configured by 8 pixels×8 lines). Next, coefficients (DCT coefficients) obtained by DCT are quantized in predetermined quantization step size, and further, the quantized coefficients are transformed to be scanned in accordance with a predetermined scan pattern so that zero coefficients whose values are zero are maximally continuous from among the DCT coefficients. Then, variable length encoding (VCL) employing a zero-run length is carried out, whereby an encoded bit stream that is compression-encoded video data is obtained.

This compression-encoded video data inputs to a variable length decoder (VLD) 102, and the variable length code concerning the quantized DCT coefficients and the variable length code concerning various parameters are decoded. The variable length code concerning the quantized DCT coefficients is obtained by variable length encoding a zero-run length indicating a continuous length of the quantized and scan-transformed zero coefficients (DCT coefficients whose value is zero) and a nonzero coefficient (DCT coefficient whose value is nonzero) following thereto. The variable length decoder 102 outputs the decoding result every time the variable length code is decoded. When the variable length code concerning the DCT coefficients is decoded, the decoder outputs the zero-run length and quantized nonzero coefficient as the decoding result every time each variable length code is decoded.

Of the decoding results output from the variable length decoder 102, the quantized nonzero coefficient that are the decoding results of the variable length codes concerning the DCT coefficients are inverse-quantized by the inverse quantizer (IQ) 103. The variable length decoder 102 stops its output in units of one coefficient when the inverse quantizer 103 does not enable reception of the decoding results.

A scan-address generator in the inverse quantizer 103 accumulates its zero-run length and one every time the zero-run length is received from the variable length decoder 102, and generates scan address data indicating a coefficient position of the nonzero coefficient. The inverse quantizer 103 generates the corresponding quantization step size data every coefficient position of nonzero coefficient based on the scan address data and the scan pattern data indicating a scan pattern used in the video data encoding apparatus. Then, inverse quantization is carried out by multiplying the quantization step size data with nonzero coefficients sequentially received from a variable length decoder 102. The quantization step size data is data that indicates a quantization step size when the DCT coefficient is quantized in the video data encoding apparatus. A scan address generator in the inverse quantizer 103 will be described later in detail.

If nonzero coefficient does not exist at the final position of a block when the inverse quantizer 103 receives a block end signal indicating the end of the block from the variable length decoder 102, the inverse quantizer 103 generates a zero coefficient as the final DCT coefficient of the block, thereby carrying out so called IDCT mismatch control processing. The inverse quantizer 103 outputs to a FIFO (first-in first-out) memory 104 the DCT coefficients indicating the inverse quantization results and obtained after carrying out the IDCT mismatch control processing, scan address data indicating a position of the DCT coefficient and scan pattern data. The inverse quantizer 103 stops its output in units of one coefficient in the case where the FIFO memory 104 is unreceivable these data.

The FIFO memory 104 has a capacity capable of storing about 128 DCT coefficients such that a stop request to the variable length decoder 102 is mitigated and the variable length decoder 102 enables variable length decoding continuously over one macro-block (6 blocks). The FIFO memory 104 stores data on the inverse quantization result from the inverse quantizer 103 (DCT coefficients after IDCT mismatch control processing), scan address data, and scan pattern data. More specifically, the FIFO memory 104 stores valid coefficients and scan address data as a set together with scan pattern data every time the memory receives the valid coefficients (nonzero coefficient and maximum frequency component coefficient) of the DCT coefficients and scan address data. When its remaining space reaches a predetermined value (for example, zero), the memory is unreceivable output data from the inverse quantizer 103. Such an operation is controlled by a controller (not shown).

In addition, after the valid coefficients in one block have been written into the FIFO memory 104, the valid coefficients starts to be read out in the written order. Readout is stopped when the stored valid coefficients become zero or when the zero-run reconstruction processor 105 does not enable data reception.

The zero-run reconstruction processor 105 includes a zero-run reconstruction device 106 and a block buffer 107. The zero-run reconstruction device 106 increments an internal scan address counter one by one for each clock, and rejects next data input from the FIFO memory 104 until the scan address received from the FIFO memory 104 has coincided with the output value of the internal scan address counter. The zero coefficients corresponding in number to the zero-run length are generated by setting an output to zero during the above stop period. The generated zero coefficients and the valid coefficients received from the FIFO memory 104 output together with scan pattern data and the output value of the scan address counter.

Figure 3:
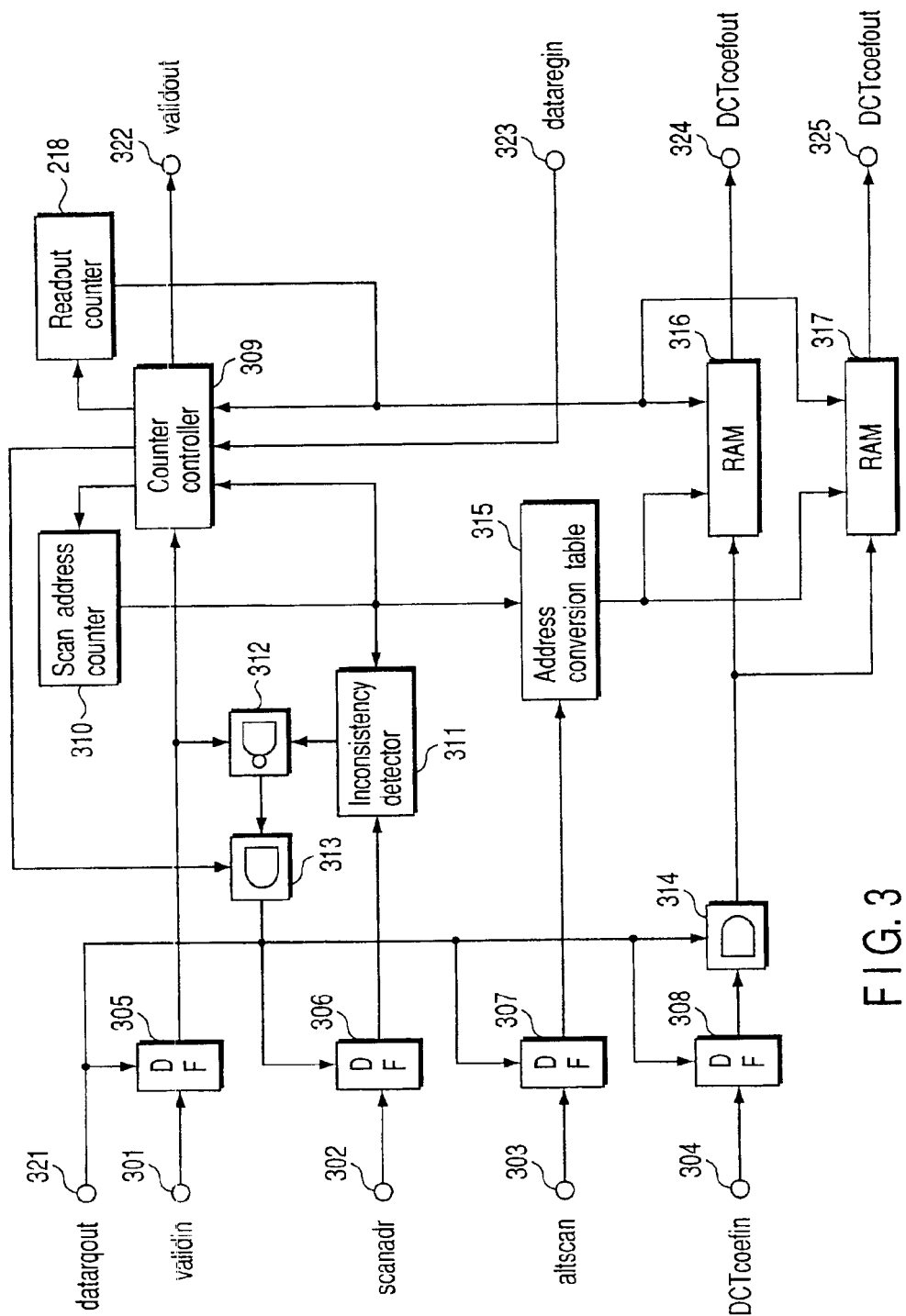
FIG. 3 is a circuit diagram illustrating a zero-run reconstruction/output processor in the present embodiment.

The block buffer 107 is a DCT coefficient storage that has a coefficient memory (RAM) capable of storing DCT coefficients (nonzero coefficients) in one block. The block buffer 107 writes into a predetermined address of the coefficient memory all the DCT coefficients in one block received from the zero-run reconstruction device 106. After the end of writing about 60% (58% to 62%) of all the DCT coefficients in one block, the block buffer reads out two DCT coefficients from the coefficient memory in units of one block. For example, compression-encoded video data based on the MPEG2 scheme includes 64 DCT coefficients in one block. Thus, after 39 to 42 DCT coefficients have been written in the coefficient memory (RAM of the block buffer 17), two DCT coefficients each are read out from the coefficient memory. In this manner, in decoding based on the MPEG2 scheme, in any of a first scan pattern shown in Table 1 (zigzag pattern) and a second scan pattern shown in Table 2 as well, it is possible to sequentially read out all the DCT coefficients in one block two by two in order shown in FIG. 3.

TABLE 1 alternate scan 0 (zig-zag-scan)

| v\u | 0 | 1 | 2 | 3 | 4 | 5 | 6 | 7 |
|---|---|---|---|---|---|---|---|---|
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| 7 | 35 | 36 | 48 | 49 | 57 | 58 | 62 | 63 |

TABLE 2 alternate scan 1

| v\u | 0 | 1 | 2 | 3 | 4 | 5 | 6 | 7 |
|---|---|---|---|---|---|---|---|---|
| 0 | 0 | 4 | 6 | 20 | 22 | 36 | 38 | 52 |
| 1 | 1 | 5 | 7 | 21 | 23 | 37 | 39 | 53 |
| 2 | 2 | 8 | 19 | 24 | 34 | 40 | 50 | 54 |
| 3 | 3 | 9 | 18 | 25 | 35 | 41 | 51 | 55 |
| 4 | 10 | 17 | 26 | 30 | 42 | 46 | 56 | 60 |
| 5 | 11 | 16 | 27 | 31 | 43 | 47 | 57 | 61 |
| 6 | 12 | 15 | 28 | 32 | 44 | 48 | 58 | 62 |
| 7 | 13 | 14 | 29 | 33 | 45 | 49 | 59 | 63 |

TABLE 3

Output order of two-dimensional DCT coefficients

| Output | v\u | 0 | 1 | 2 | 3 | 4 | 5 | 6 | 7 |
|---|---|---|---|---|---|---|---|---|---|
| IQDT[23:12] | 0 | 2 | 6 | 10 | 14 | 18 | 22 | 26 | 30 |
| IQDT[11:0] | 1 | 2 | 6 | 10 | 14 | 18 | 22 | 26 | 30 |
| IQDT[23:12] | 2 | 0 | 4 | 8 | 12 | 16 | 20 | 24 | 28 |
| IQDT[11:0] | 3 | 0 | 4 | 8 | 12 | 16 | 20 | 24 | 28 |
| IQDT[23:12] | 4 | 3 | 7 | 11 | 15 | 19 | 23 | 27 | 31 |
| IQDT[11:0] | 5 | 1 | 5 | 9 | 13 | 17 | 21 | 25 | 29 |
| IQDT[23:12] | 6 | 1 | 5 | 9 | 13 | 17 | 21 | 25 | 29 |
| IQDT[11:0] | 7 | 3 | 7 | 11 | 15 | 19 | 23 | 27 | 31 |

Here, in the worst case in which the start of reading out DCT coefficients is delayed because valid coefficients in one block are concentrated at the latter half of scan sequences, the storage capacity of the FIFO memory 104 required for the variable length decoder 102 to sequentially carry out processing in one macro-block (six blocks) is investigated as shown in Table 4. As the result, the maximum value of the required capacity is 128 words (the capacity corresponding to two blocks) when 32 valid coefficients in one block (nonzero coefficient+EOB) are present.

TABLE 4

FIFO capacity required for valid coefficients in one block and Six-block continuous processing of VLD processor (number of words)

| Valid coefficients | 1 | 2 | 3 | 4 | 5 | 6 | 7 | 8 |
|---|---|---|---|---|---|---|---|---|
| Required capacity | 6 | 12 | 18 | 24 | 30 | 36 | 42 | 48 |
| Valid coefficients | 9 | 10 | 11 | 12 | 13 | 14 | 15 | 16 |
| Required capacity | 54 | 60 | 64 | 64 | 65 | 70 | 75 | 80 |
| Valid coefficients | 17 | 18 | 19 | 20 | 21 | 22 | 23 | 24 |
| Required capacity | 85 | 90 | 95 | 100 | 105 | 106 | 105 | 104 |
| Valid coefficients | 25 | 26 | 27 | 28 | 29 | 30 | 31 | 32 |
| Required capacity | 103 | 104 | 108 | 112 | 116 | 120 | 124 | 128 |
| Valid coefficients | 33 | 34 | 35 | 36 | 37 | 38 | 39 | 40 |
| Required capacity | 126 | 124 | 122 | 120 | 118 | 116 | 117 | 120 |
| Valid coefficients | 41 | 42 | 43 | 44 | 45 | 46 | 47 | 48 |
| Required capacity | 123 | 126 | 127 | 124 | 121 | 118 | 115 | 112 |
| Valid coefficients | 49 | 50 | 51 | 52 | 53 | 54 | 55 | 56 |
| Required capacity | 109 | 106 | 103 | 104 | 106 | 104 | 100 | 96 |
| Valid coefficients | 57 | 58 | 59 | 60 | 61 | 62 | 63 | 64 |
| Required capacity | 92 | 88 | 84 | 80 | 76 | 72 | 68 | 64 |

However, in actuality, a plurality of pipeline registers exist in the inverse quantizer 103, and thus, the memory capacity of the FIFO memory may be slightly smaller than 128 words. In addition, as shown in Table 5, in the case where one macro-block includes eight blocks, the capacity of the FIFO memory 104 is set to 160 words (the capacity corresponding to 2.5 blocks), thereby making it possible for the variable length decoder 102 to continuously carry out variable length decoding for compression-encoded video data by 1 macro-block.

TABLE 5

Number of continuous processing blocks at VLD processor and
FIFO capacity required when 32 valid coefficients exist in one block

| Block number | 1 | 2 | 3 | 4 | 5 | 6 | 7 | 8 | 9 | 10 | 11 |
|---|---|---|---|---|---|---|---|---|---|---|---|
| Input coefficients | 32 | 32 | 32 | 32 | 32 | 32 | 32 | 32 | 32 | 32 | 32 |
| Output coefficients | 0 | 0 | 32 | 0 | 32 | 0 | 32 | 0 | 32 | 0 | 32 |
| Required capacity | 32 | 64 | 64 | 96 | 96 | 128 | 128 | 160 | 160 | 192 | 192 |

The DCT coefficients output from the block buffer 107 included in the zero-run reconstruction processor 105 are subjected to inverse discrete cosine transformation by the inverse discrete cosine transformer (IDCT) 108. The transformed coefficients input to a motion compensator 109. When the motion compensator 109 receives parameters such as a motion vector and predictive mode information input from a parameter extractor 110, it carries out motion compensation while the already decoded video signal stored in a frame memory 111 is defined as a reference video signal to generate a predictive signal. This predictive signal is written into the frame memory 111, and a decoded video signal outputs from this frame memory 111 via an output terminal 112.

In the present embodiment, although the FIFO memory 104 has disposed at the back stage of the inverse quantizer 103, this memory may be disposed between the variable length decoder 102 and the inverse quantizer 103. In short, the FIFO memory 104 may be positioned between the variable length decoder 102 and the zero-run reconstruction processor 105.

Figure 2:
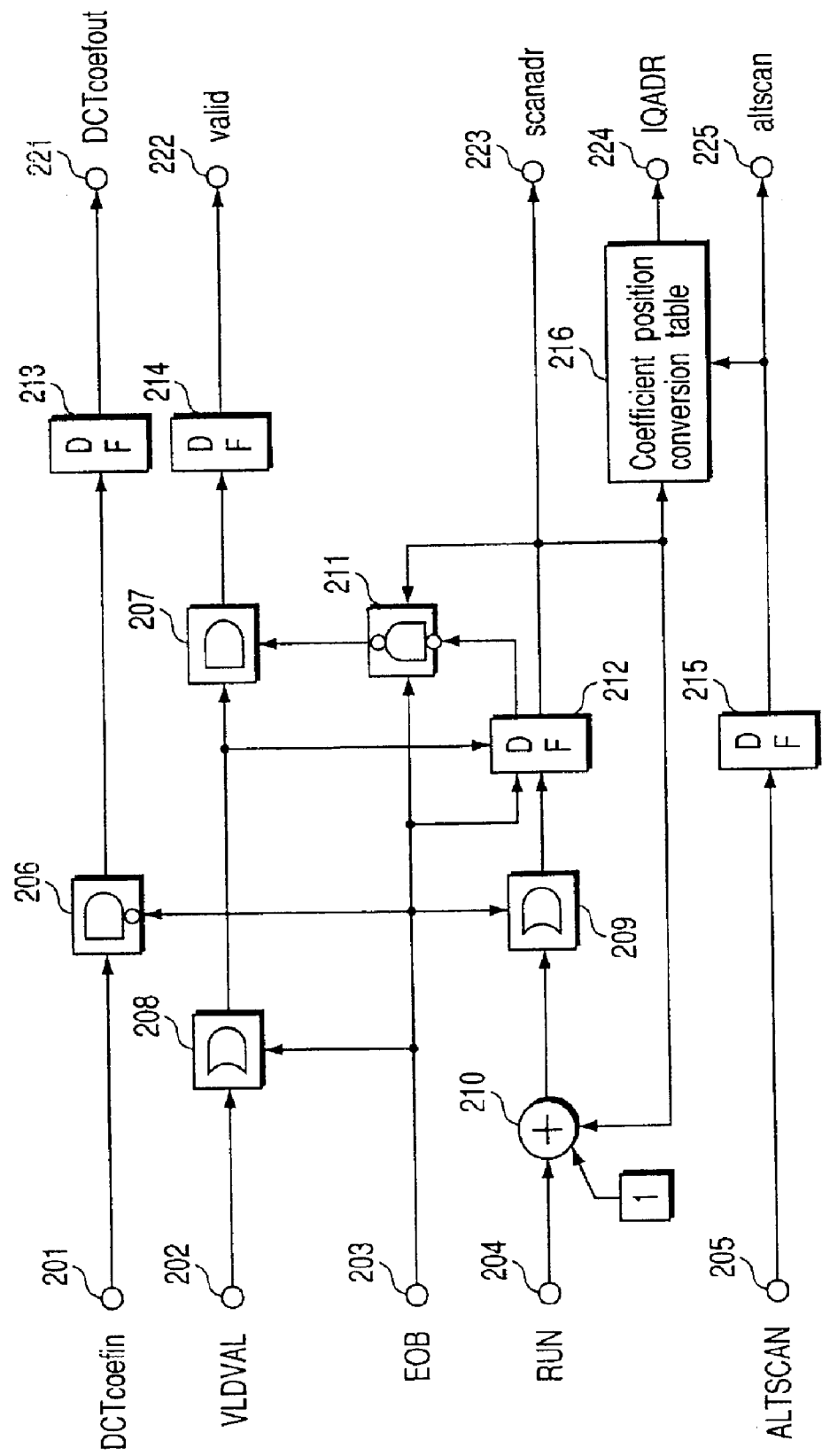
FIG. 2 is a circuit diagram illustrating a scan address generator in an inverse quantizer in the present embodiment.

Now, a scan address generator incorporated in the inverse quantizer 103 shown in FIG. 1 will be described here with reference to FIG. 2.

A DCT coefficient (DCTcoefin), a valid/invalid information (VLDVAL), end-of-block information (EOB), a zero-run length (RUN), and scan pattern data (ALLSCAN) are supplied from the variable length decoder 102 to input terminals 201, 202, 203, 204, and 205, respectively. The valid/invalid information is information that represents whether the DCT coefficient (DCTcoefin), zero-run length, and scan pattern data (ALTSCAN) are valid or invalid. In this example, when "1" is set, it indicates valid information. The end-of-block signal (EOB) is a signal with one-clock step size indicating the end of the block when "1" is set.

The scan address generator comprises AND gates 206 and 207, OR gates 208 and 209, an adder 210, a NAND gate 211, registers 212 to 215, and a coefficient position conversion table 216.

In the initial state, all the output bits (six bits) of the register 212 are set to "1". The register 212 stores input data only when OR between the valid/invalid information (VLDVAL) and the end-of-block information (EOB) is set to "1". That is, in this case, a value obtained by adding "1" to a valid value of the zero-run length (RUN) is accumulated by the adder 210, and the accumulated data is stored in the register 212 via the OR gate 209 and outputs as a scan address (scanadr) from an output terminal 223.

When the end-of-block information inputs to terminal 203, the AND gate 206 sets its output to "0" irrespective of the DCT coefficient value (DCTcoefin), and outputs it as the DCT coefficient (DCTcoefout) to the output terminal 221 via the register 213. In addition, when an end-of-block signal inputs to the terminal 203, the OR gate 209 converts all the output bits (6 bits) of the adder 210 into "1", and outputs it to the register 212. The register 212 stores an output of the OR gate 209 together with the end-of-block signal (EOB). In this manner, scan address data (scanadr) indicating the final scan address outputs from the output terminal 223 as in the initial state. In this case, the output data (one bit) corresponding to the end-of-block information (EOB) that the register 212 has stored is obtained as a flag indicating an initial state.

A coefficient position conversion table 216 generates address data for reading quantization step size information (IQADR) that corresponds to a coefficient position based on scan address data (scanadr) output from the register 212 and scan pattern data (ALTSCAN) input via the register 215. The address data (IQADR) is supplied to a quantization step size data memory (not shown) included in the inverse quantizer 103 via the output terminal 224, and the supplied information is employed for reading out the quantization step size data.

The NAND gate 211 outputs "0" when all the bits of the scan address data (scanadr) read from the register 212 are set to "1", and when the end-of-block information (EOB) is set to "1". The AND gate 207 performs logical multiplication on an output of the OR gate 208 and an output of the NAND gate 211. The output of the AND gate 207 outputs as valid/invalid information (validin) from an output terminal 222 via the register 214.

The valid/invalid information is information that indicates whether the DCT coefficient (DCTcoefout) outputs from the output terminal 221, scan address data (scanadr) output from an output terminal 223, address data (IQADR) output from an output terminal 224, and scan pattern data (altscan) output from an output terminal 225 are valid or invalid. That is, when the end-of-block information (EOB) inputs to the terminal 203, in the case where a nonzero coefficient does not exist at the final position of the scan address data (scanadr) including the initial state, the zero value of the DCT coefficient (DCTcoefout) output to the output terminal is valid. In the case where a nonzero coefficient exists at the final position of the scan address data (scanadr), the zero value of the DCT coefficient (DCTcoefout) output to the output terminal 221 is invalid.

In the inverse quantizer 103, the quantization step size data read out from the quantization step size data memory is multiplied with the DCT coefficient (DCTcoefout). The DCT coefficient (DCTcoefout) outputs from the output terminal 221 of the scan address generator shown in FIG. 2 in accordance with the address data (IQADR) for reading quantization step size information output from the output terminal 224. As a result, inverse quantization processing is carried out.

Now, a specific exemplary configuration of a zero-run reconstruction processor 105 will be described here.

Valid/invalid information (validin), scan address data (scanadr), scan pattern data (altscan), and DCT coefficient (DCTcoefin) input to input terminals 301, 302, 303, and 304, respectively, from the inverse quantizer 103 shown in FIG. 1 via the FIFO memory 104. The valid/invalid information (validin) is maintained in a register 305. When valid/invalid information (validin) maintained in this register 305 is valid, the counter controller 309 counts up a scan address counter 310 every clock.

The scan address data (scanadr) is maintained in a register 306. The value of the scan address data (scanadr) maintained in this register 306 is compared with an output value of the scan address counter 310 by an inconsistency detector 311. When the scan address data (scanadr) is inconsistent with the output value of the scan address counter 310, the detector 311 outputs "1". When they coincide, the detector 311 outputs "0". The output of the inconsistency detector 311 is input to a NAND gate 312. The NAND gate 312 checks whether or not the value of the scan address data (scanadr) coincides with the output value of the scan address counter 310 while the valid/invalid information (validin) maintained in the register 305 is valid. When inconsistency is obtained, "0" is obtained, and when consistency is obtained, "1" outputs, respectively. The output of the NAND gate 312 inputs to an AND gate 313.

The AND gate 313 sets to "0" a data request (datarequout) to be output from the output terminal 321 to the FIFO memory 104 shown in FIG. 1 when the value of the scan address data (scanadr) does not coincide with the output value of the scan address counter 310 while a data request by a counter controller 309 is stopped or while valid/invalid information (validin) input via the register 305 is valid. In this manner, data input from the FIFO memory 104 is interrupted, and the value of the DCT coefficient (DCTcoefin) input from the input terminal 304 via the register 308 is set to zero at an output of the AND gate 314.

An address conversion table 315 outputs a write memory selection signal for selecting either one of RAMs 316 and 317 (referred to as a half block coefficient memory) each having a storage capacity corresponding to a half block and a write address based on the scan pattern data (altscan) input from the input terminal 303 via a register 307 and the output value of the scan address counter 310. Here, although a write enable signal is not shown, a write enable signal is generated based on a write control signal output from the counter controller 309 only when valid/invalid information (validin) is valid and a write memory selection signal output from an address conversion table 315. In accordance with the write address enable signal, the DCT coefficient (DCTcoefin) input from the input terminal 304 to the AND gate 314 via the register 308 is written into either of the half block memories 316 and 317 selected in accordance with the write memory selection signal. The write addresses of the half block memories 316 and 317 are assigned by the address conversion table 315.

The half block memories 316 and 317 are the previously described coefficient memories incorporated in the block buffer 107 shown in FIG. 1. The storage capacity of each half block specifically corresponds to 32 DCT coefficients. The counter controller 309 counts up a readout counter 318 every clock when the controller receives a data request (dataredin) from the inverse discrete cosine transformer 108 shown in FIG. 1 via an input terminal 323. Then, the controller completes in 32 clocks the readout of the DCT coefficients written into the half block memories 316 and 317, respectively.

In addition, the counter controller 309 enables writing of up to 15 DCT coefficients in a new block when a total remaining capacity of each of the half block memories 316 and 317 corresponds to 40 DCT coefficients. When readout of the DCT coefficients in the immediately preceding block has completed, a write restriction is released. The readout of the DCT coefficients in such a new block is started after writing of 40 DCT coefficients in that block has completed.

In this way, according to the present embodiment, a FIFO memory 104 capable of storing nonzero coefficients contained in a plurality of blocks (for example, six blocks configuring one macro-block=128 words) is provided between a variable length decoder 102 and a zero-run reconstruction processor 105, whereby decoding of variable length code and inverse quantization of the variable length decoded result can be carried out continuously over one macro-block or more at the variable length decoder 102 and inverse quantizer 103 at the front stage of the FIFO memory 104.

That is, as is the conventional case where decoding for each block terminates within a short period of time in blocks with a small amount of nonzero coefficients, the processing efficiency of the entire data decoding apparatus is improved without variable decoding being interrupted frequently. Therefore, high speed processing can be achieved without an increase in circuit scale or an increase in power consumption.

In addition, in the present embodiment, a block buffer 107 (DCT coefficient storage portion) having a capacity capable of storing a plurality of DCT coefficients, for example, 64 DCT coefficients (nonzero coefficients) contained in one block is provided in a zero-run reconstruction processor 105. The nonzero coefficients contained in the inverse quantization result input from the inverse quantizer 103 to the zero-run reconstruction processor 105 via the FIFO 104 and the zero coefficients generated at the zero-run reconstruction processor 106 are written into the block buffer 107, for example, two coefficients each are read out at a higher speed in predetermined order according to a scan pattern, and rate conversion is carried out, whereby the DCT coefficients after zero-run reconstruction can directly input to an inverse discrete cosine transformer 108 with a high processing speed.

In this case, in particular, in the present embodiment, after the completion of writing about 60% (58% to 62%) of 64 DCT coefficients that configure one block, for example, into the block buffer 107, the DCT coefficients are read out at a speed twice the write speed, whereby the DCT coefficients in one block can continuously output in any of two types of patterns. Thus, the output delay is small, and a configuration of a control system is simplified.

In addition, according to the present embodiment, when the inverse quantizer 103 receives end-of-block information (EOB) from the variable length decoder 102, only in the case where a nonzero coefficient does not exist at the final coefficient position of the block, a zero coefficient outputs to be inserted into the final coefficient position. The zero coefficient is inserted as a valid coefficient only in the case where the final coefficient does not exist in scan sequence. Thus, only a minimum number of valid coefficients required for IDCT mismatch control processing in the MPEG2 scheme outputs.

Moreover, from among the outputs from the inverse quantizer 103, the scan address data (altscan) at the final coefficient position indicates end-of-block information. Thus, there is no need to specifically output the end-of-block information from the inverse quantizer 103 to the FIFO memory 104. Therefore, the quantity of data to be written into the FIFO memory 104, i.e., the storage capacity of the FIFO memory 104 can be reduced to its required minimum.

Further, the zero-run reconstruction processor 105 generates a zero coefficient based on inconsistency between an output value of the scan address counter 310 and scan address data (scanadr) received from the FIFO memory 104 instead of overwriting only valid coefficients after the one-block data contained in the block buffer 107 has been rewritten into zero in advance. Thus, the write count of the block buffer 107 is reduced to its required minimum, making it possible to use a memory with a small number of ports in the block buffer 107.

Figure 4:
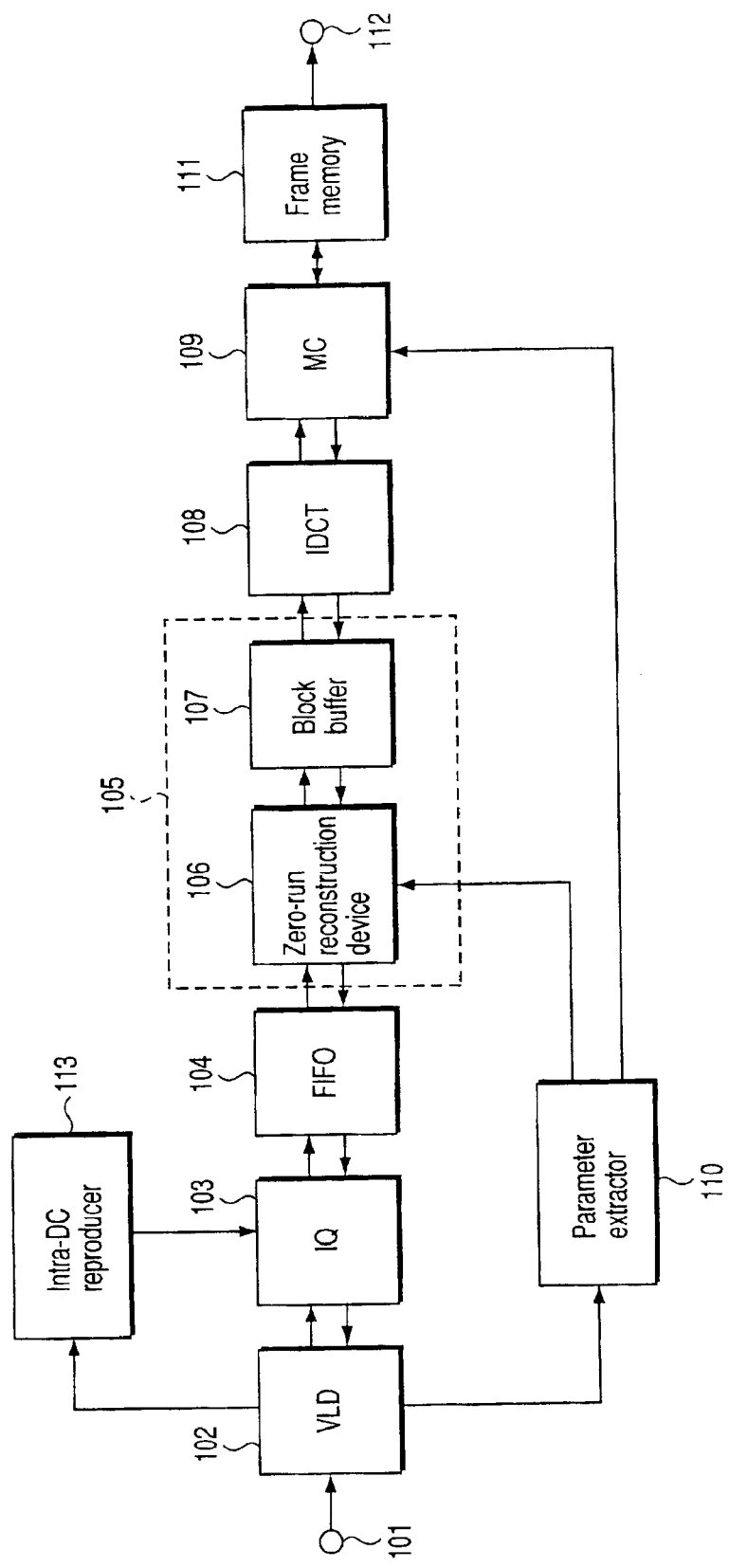
FIG. 4 is a block diagram illustrating a data decoding apparatus according to a second embodiment of the present invention.

FIG. 4 shows a data decoding apparatus according to a second embodiment of the present invention. The present embodiment is suitable when decoding of DPCM (differential PCM encoding) is required for reproduction of a DC component in intra-blocks. Like elements shown in FIG. 1 are designated by like reference numerals. In the present embodiment, an intra-DC reconstruction device 113 is added to the configuration according to the first embodiment shown in FIG. 1.

This intra-DC reproducer 113 reproduces the DC component of the DCT coefficient in intra-blocks in parallel with inverse quantization processing at the inverse quantizer 103, and outputs the result to the FIFO memory 104 together with the inverse quantization result from the inverse quantizer 103. With such a configuration, there is an advantage that an increase in processing delay of the inverse quantizer 103 due to reproduction of the DC component can be avoided.

FIG. 5 is a view showing a data decoding apparatus according to a third embodiment of the present invention. The present embodiment is directed to a configuration particularly suitable to decoding of the compression-encoded video data of a high definition digital television broadcast signal, wherein two pairs of decoding processors 120a and 120b and two pairs of parameter extractors 110a and 110b are provided.

The decoding processors 120a and 120b each comprise a variable length decoder 102, an inverse quantizer 103, a FIFO memory 104, and a zero-run reconstruction processor 105 (zero-run reconstruction device 106 and block buffer 107) shown in FIG. 1, and further, may comprise an intra-DC reproducer 113 shown in FIG. 4.

The decoding processors 120a and 120b receive two data streams corresponding to for example, two channels in units of slices or in units of pictures input, respectively, via input terminals 101a and 101b. In this time, DCT coefficients output from the block buffer 107 that is a coefficient memory at a speed twice an output speed of the zero-run reconstruction device 106 in the zero-run reconstruction processor 105 as in the first and second embodiments.

On the other hand, parameter extractors 110a and 110b provided corresponding to the decoding processors 120a and 120b, respectively, output parameters concerning one macro-block to a motion compensator 109 every time the variable length decoder 102 included in each of the decoding processors 120a and 120b completes decoding of one macro-block.

The DCT coefficients output from the decoding processors 120a and 120b alternately every block are subjected to inverse discrete cosine transformation by the inverse discrete cosine transformer 108, and then, the transformed coefficients are supplied to the motion compensator 109. In the case where the inverse discrete cosine transformer 108 can not receive the DCT coefficient alternately from the decoding processors 120a and 120b, the inverse discrete cosine transformer 108 receives the DCT coefficient from one of the decoding processors 120a and 120b that can output the DCT coefficient earlier than the other, and subjects it to inverse discrete cosine transformation. In addition, in the case where the motion compensator 109 does not enable reception of the result of inverse discrete cosine transformation, the inverse discrete cosine transformer 108 stops in a state that can output the IDCT result in units of blocks immediately when reception is enabled.

The motion compensator 109 receives macro-block parameters from two parameter extractors 110a and 110b every macro-block, and selects macro-block parameters alternately from the parameter extractors 110a and 110b. Motion prediction processing (predictive signal generation processing employing a reference video signal) according to the macro-block parameters is carried out for the IDCT result from the inverse discrete cosine transformer 108, and the transformed data is temporarily stored in a predictive signal memory corresponding to one macro-block.

In addition, in the case where reception of the macro-block parameters has not been completed from either of the parameter extractors 110a and 110b, the motion compensator 109 carries out motion prediction processing for the macro-block parameter that can receive earlier than the other.

The motion compensator 109 includes a compensation memory capable of storing the IDCT results that correspond to two or more macro-blocks, and adds the IDCT results and the predictive signal primarily stored in the predictive signal memory every time the IDCT results and the predictive signal of a luminance signal or a chrominance signal are obtained, and output them to a frame memory 111.

This frame memory 111 is a memory that stores a plurality of decoded video frame signals. This frame memory temporarily stores a reference video signal used in the motion compensator 109, and then, outputs to an output terminal 112 decoded video frame images in a display order.

In this manner, according to the present embodiment, there are provided two decoding processors 120a and 120b each comprising a variable length decoder, an inverse quantizer, and a zero-run reconstruction device that are difficult in high speed processing. Only one of the respective inverse discrete cosine transformer 108 and motion compensator 109 that are easy in high speed processing is provided, thereby making it possible to achieve high speed decoding of compression-encoded video data such as compression-encoded video data on a high definition digital TV broadcast signal with a smaller configuration.

In addition, according to the present embodiment, the inverse discrete cosine transformer 108 switches DCT coefficients output from two decoding processors 120a and 120b in units of blocks, carries out inverse cosine transform processing, and directly outputs the coefficients. Thus, the processing delay at the inverse discrete cosine transformer 108 is small, and a simple circuit configuration can be provided.

As has been described above, according to the present invention, there can be provided a data decoding apparatus, wherein a FIFO memory capable of storing nonzero coefficients contained in a plurality of blocks is interposed between a variable length decoder and a zero-run reconstruction processor, whereby processing efficiency of the variable length decoding can be efficiently improved, speedy processing after zero-run reconstruction is eliminated, and decode processing of compression-encoded video data with a high encoding rate can be carried out while reducing the circuit scale and power consumption.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A decoding apparatus configured to decode compression-encoded video data including a variable length code, comprising:

a plurality of decompression processors to decompress a plurality of compression-encoded video data corresponding to a plurality of channels, respectively, each of the decompression processors including:

a variable length decoder which decodes the variable length code to output zero-run length data and nonzero coefficients;

an inverse quantizer which inverse-quantizes the nonzero coefficients to output an inverse-quantized result;

a zero-run reconstruction device configured to reconstruct zero coefficients corresponding to the zero-run length data; and a FIFO (First-In First-Out) memory arranged between the inverse quantizer and the zero-run reconstruction device configured to store the nonzero coefficients of the inverse-quantized result, the memory operating with first-in first-out and having a memory capacity for storing coefficients contained in a plurality of blocks;

a plurality of parameter extractors provided corresponding to the decompression processors, configured to generate parameters concerning one macro-block every time the variable length decoder included in each of the decompression processors completes decoding of one block;

an inverse discrete cosine transformer which subjects the coefficients from the decompression processors to inverse discrete cosine transformation to obtain transformed coefficients; and a motion compensator which subjects the transformed coefficients to a motion compensation in accordance with the parameters concerning one block input from the parameter extractors alternately.

2. An apparatus according to claim 1, wherein the variable length decoder decodes the variable length code corresponding to a macro block including a predetermined number of blocks.

3. An apparatus according to claim 1, wherein the zero-run reconstruction device includes a buffer memory configured to write in the zero coefficients and the nonzero coefficients therein at a write-in speed and read out them therefrom at a readout speed higher than the write-in speed.

4. An apparatus according to claim 1, wherein if the nonzero coefficients fail to exist at a final position of a block when the inverse quantizer receives a block end signal indicating the end of the block from the variable length decoder, the inverse quantizer generates a zero coefficient as a final DCT coefficient of the block.

5. An apparatus according to claim 1, wherein the variable length decoder stops its output in units of one coefficient when the inverse quantizer fails to receive the zero-run length data and the nonzero coefficients from the variable length decoder.

6. An apparatus according to claim 1, wherein every time the inverse quantizer receives the zero-run length data from the variable length decoder, the inverse quantizer accumulates a value obtained by adding "1" to the zero-run length data and generates scan address data indicating a coefficient position of the nonzero coefficients, to generate quantization step size data for every coefficient position based on the scan address data and scan pattern data indicating a scan pattern.

7. An apparatus according to claim 1, wherein the zero-run reconstruction device includes an internal scan address counter increased one by one for each clock, and rejects next data input from the FIFO memory until a scan address received from the FIFO memory has coincided with a count value of the internal scan address counter, to generate the zero coefficients corresponding to the zero-run length data.

8. An apparatus according to claim 1, which includes an intra-dc reconstruction device configured to reproduce dc components contained in the coefficients in intra-blocks in parallel with inverse quantization of the inverse quantizer.

* * * * *

UNITED STATES PATENT AND TRADEMARK OFFICE
CERTIFICATE OF CORRECTION

PATENT NO. : 6,928,115 B2
DATED : August 9, 2005
INVENTOR(S) : Uetani

It is certified that error appears in the above-identified patent and that said Letters Patent is hereby corrected as shown below:

<u>Title page, Item [54] and Column 1, line 1,</u>
Title, should read -- COMPRESSION-ENCODED DATA DECODING APPARATUS --.

Signed and Sealed this

Twenty-eighth Day of March, 2006

JON W. DUDAS
*Director of the United States Patent and Trademark Office*